United States Patent
Brown

(10) Patent No.: US 6,702,123 B1
(45) Date of Patent: Mar. 9, 2004

(54) BLOCK HOLDING DEVICE

(76) Inventor: Louis Brown, 2700 NW. 21$^{st}$ Ct., Ft. Lauderdale, FL (US) 33311

( * ) Notice: Subject to any disclaimer, the term of this patent is extended or adjusted under 35 U.S.C. 154(b) by 0 days.

(21) Appl. No.: 10/227,581

(22) Filed: Aug. 26, 2002

(51) Int. Cl.$^7$ .................................................. A47F 7/00
(52) U.S. Cl. ...................... 211/13.1; 211/49.1; 414/785
(58) Field of Search ............................... 211/13.1, 49.1, 211/193; 414/785

(56) References Cited

U.S. PATENT DOCUMENTS

| | | | | |
|---|---|---|---|---|
| 3,696,945 A | * | 10/1972 | Bobolts | ...................... 414/785 |
| 3,951,275 A | * | 4/1976 | Gagnon et al. | ............. 414/785 |
| 3,982,647 A | * | 9/1976 | Teutsch | ...................... 414/785 |
| 4,205,742 A | * | 6/1980 | Thomas et al. | |
| 6,287,073 B1 | * | 9/2001 | Lindgren et al. | ........... 414/785 |

* cited by examiner

Primary Examiner—Robert W. Gibson, Jr.

(57) ABSTRACT

A block holding device for holding a plurality of concrete blocks in a uniform manner as the blocks are made on a block maker. The device comprises a support that includes a planar elongated member having a ninety degree bend therein such that a first portion and a second portion are defined. The elongated member has an inner surface and an outer surface with respect to the bend. A plurality of brackets is attached to the inner surface of the second portion. Each of the brackets has a W-shaped configuration. A first layer of blocks may be stacked on the brackets in a first direction and a second layer of blocks stacked in a second direction such that the blocks are supported in a stacked orientation.

10 Claims, 3 Drawing Sheets

BLOCK HOLDING DEVICE

BACKGROUND OF THE INVENTION

1. Field of the Invention

The present invention relates to block cubing assemblies and more particularly pertains to a new block cubing assemblies for enabling blocks to be handled by various makes of semiautomatic cubing machines.

2. Description of the Prior Art

The use of block cubing assemblies is known in the prior art. U.S. Pat. No. 4,205,742 describes a cubing system for cubing rectangular units such as block or brick. Another type of block cubing assembly is U.S. Pat. No. 3,696,945 describes a block cubing apparatus for stacking tiers of blocks, such as cement building blocks. U.S. Pat. No. 3,951,275 describes a block cubing assembly particularly for concrete blocks.

While these devices are sufficient for their intended use, a problem has resulted from the creation of block having an irregular shape. One type of irregular blocks are those which have a pair of ends each being angled inward. Because both ends are angled inward, the blocks are difficult to stack (cubing) and the process thus requires many workers to cube them. The prior cubing devices are unable to cube these types of irregular shaped blocks.

SUMMARY OF THE INVENTION

The object of the present invention is to provide a new block cubing assembly that would eliminate the need for multiple workers to manually stacking or cubing irregularly shaped blocks, thereby boosting productivity, reducing labor costs, and minimizing the risk of injuries.

Another object of the invention is to provide a new block cubing assembly that may be attached to a block forming machine.

To this end, the present invention generally comprises a support that includes a planar elongated member having a ninety degree bend therein such that a first portion and a second portion are defined. The elongated member has an inner surface and an outer surface with respect to the bend. A plurality of brackets is attached to the inner surface of the second portion. Each of the brackets has a W-shaped configuration. A first layer of blocks may be stacked on the brackets in a first direction and a second layer of blocks stacked in a second direction such that the blocks are supported in a stacked orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
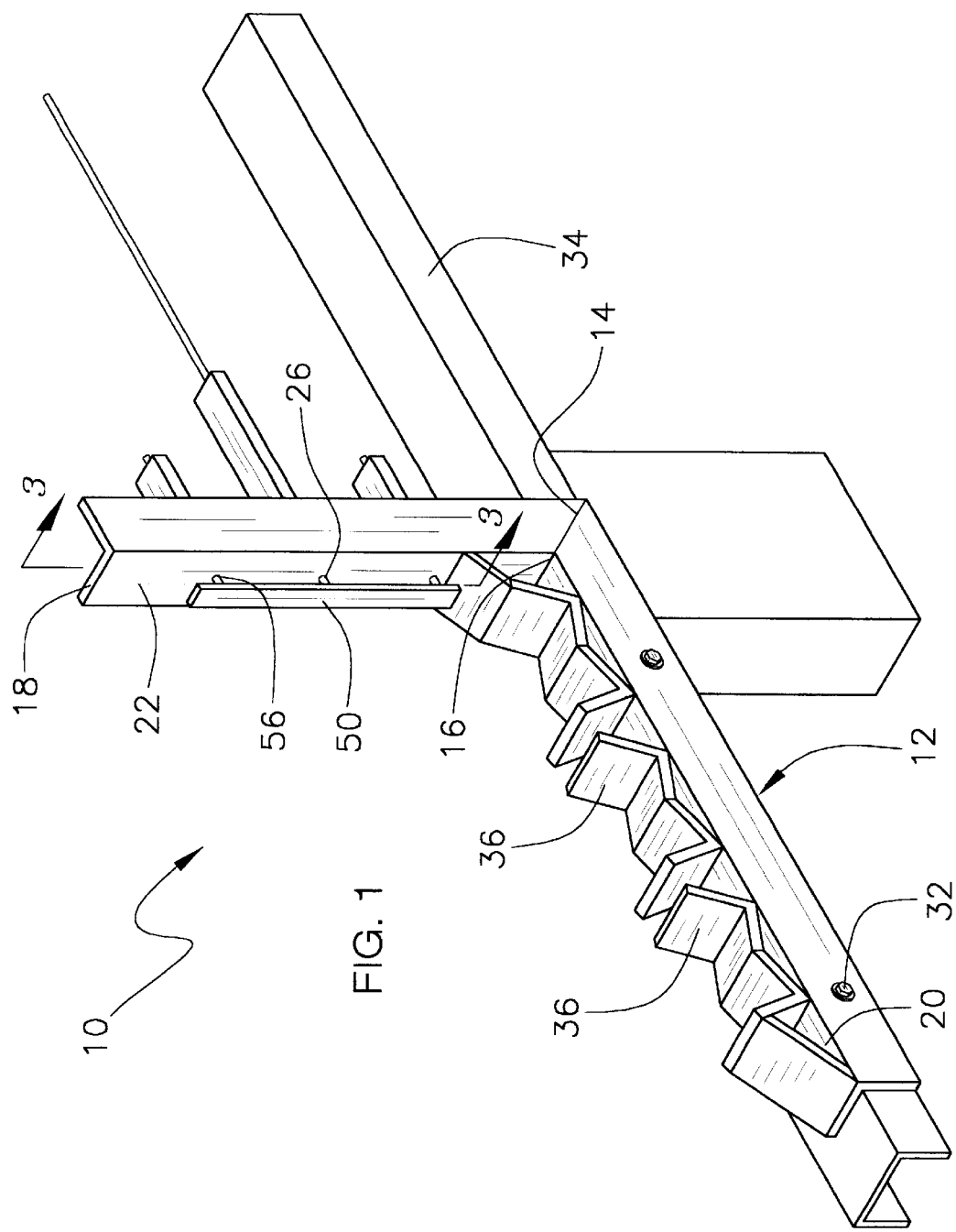
FIG. 1 is a perspective view of a block holding device according to the present invention.
Figure 2:
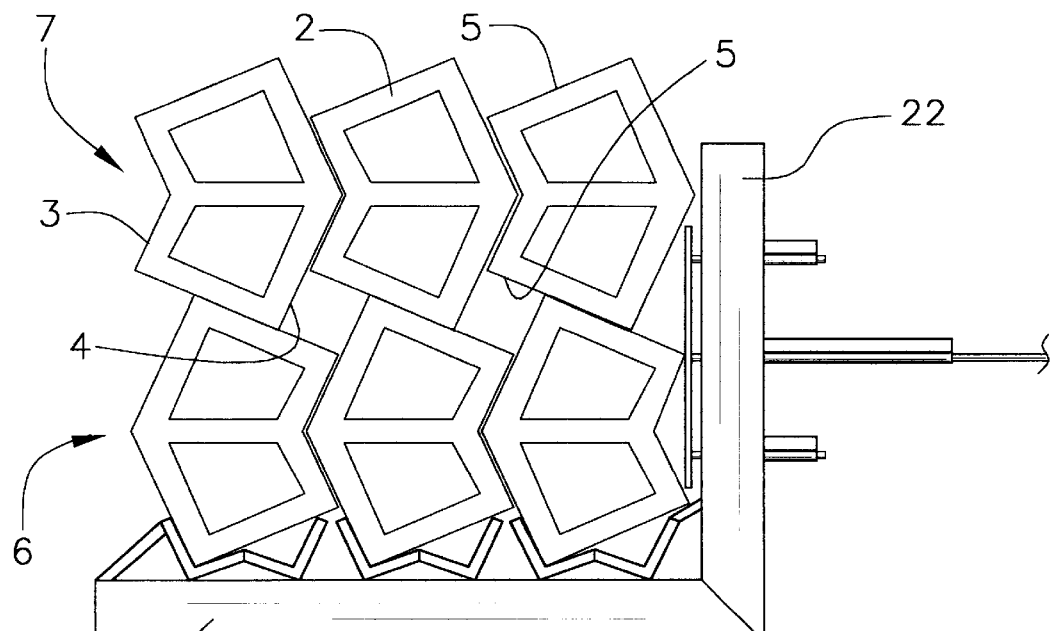
FIG. 2 is a side view of the present invention.
Figure 3:
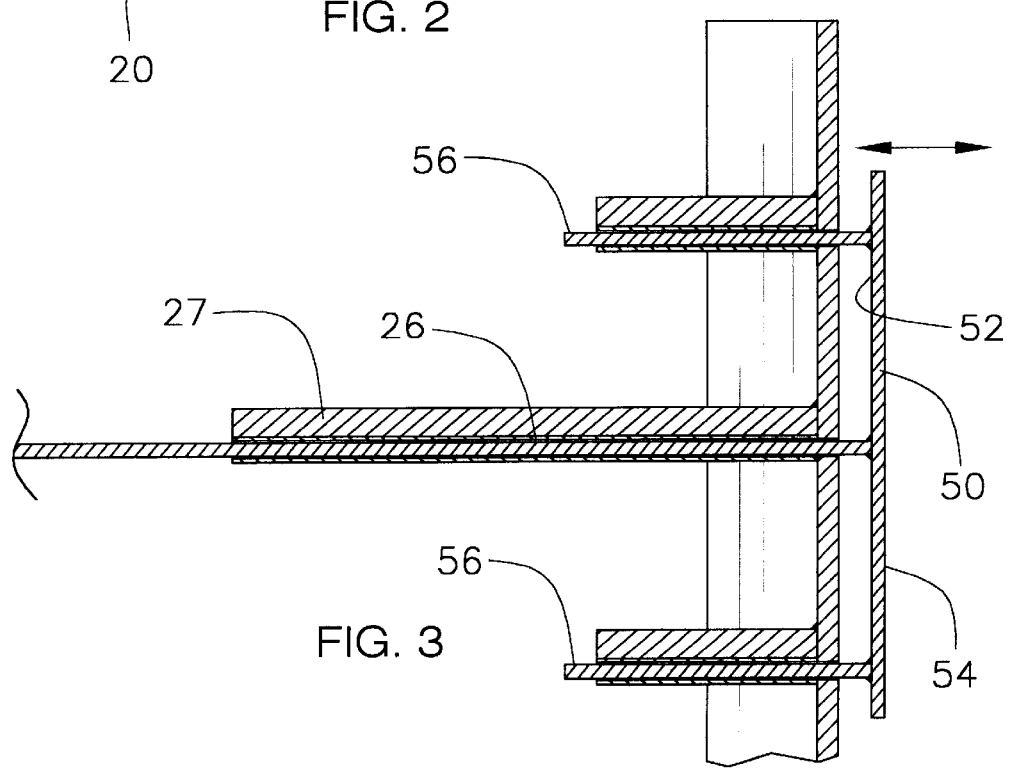
FIG. 3 is a cross-sectional view taken along the line 3—3 of FIG. 1 of the present invention.
Figure 4:
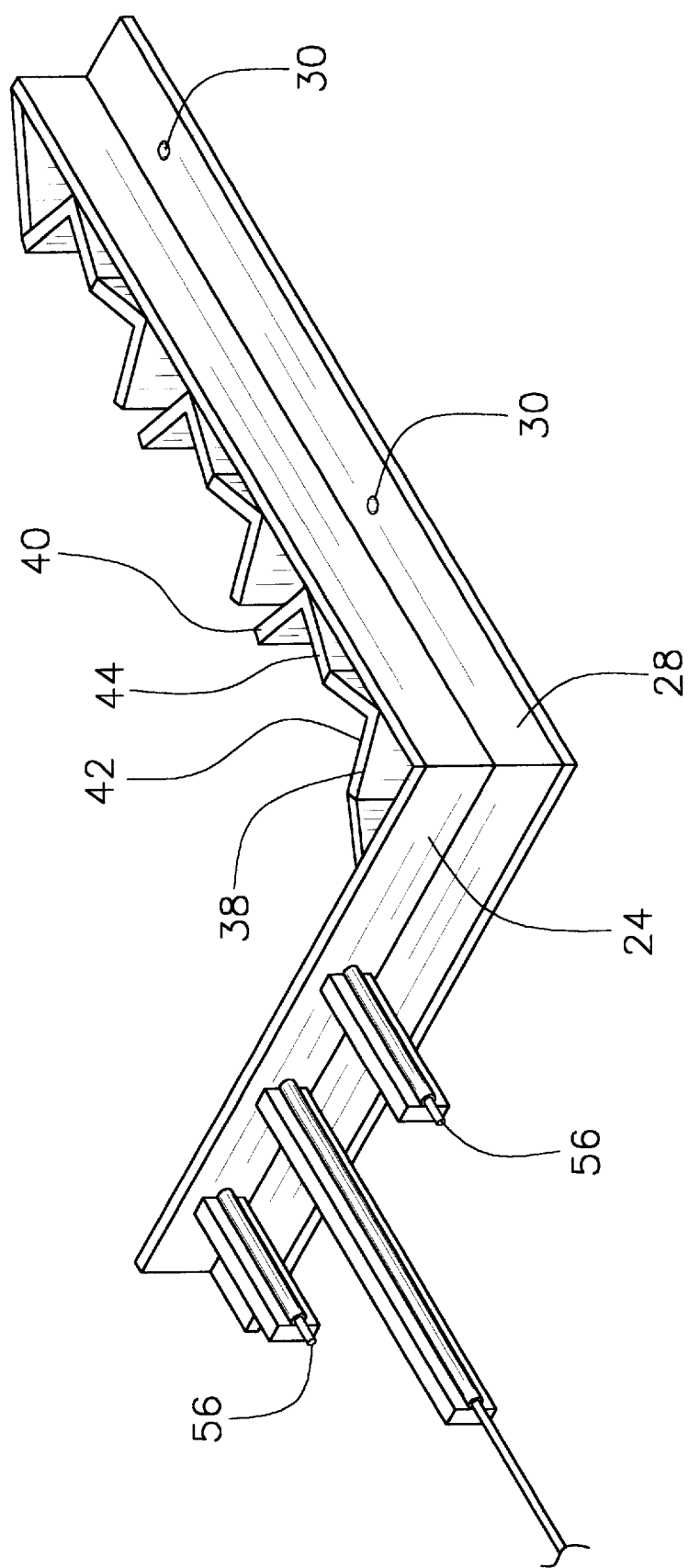
FIG. 4 is a perspective view of the present invention.

With reference now to the drawings, and in particular to FIGS. 1 through 4 thereof, a new block cubing assemblies embodying the principles and concepts of the present invention and generally designated by the reference numeral 10 will be described.

As best illustrated in FIGS. 1 through 4, the present invention generally comprises a block holding device 10 for holding a plurality of concrete blocks 2 in a uniform manner as the blocks 2 are made on a block maker. The blocks 2 generally have a six-sided configuration with a leading edge 3 pointing outward, a rear edge 4 pointing inward and a pair of ends 5 angling inward from the leading edge 3 to the rear edge 4. These types of blocks are known in the concrete block industry as "990" blocks and are made by on a Lithibar machine produced by Besser Company, 801 Johnson Street, Alpena, Mich. 49707.

The device 10 has a support 12 that includes a planar elongated member 14 having a ninety degree bend 16 therein such that a first portion 18 and a second portion 20 are defined. The elongated member 14 has an inner surface 22 and an outer surface 24 with respect to the bend 16. The first portion 18 has a plurality of holes 26 extending therethrough. A flange 28 is attached to and extends along an edge of the elongated member 14. The flange 28 lies in a plane orientated generally perpendicular to a plane of the elongated member 14, and the flange 28 is positioned adjacent to the outer surface 24. The flange 28 has a plurality of apertures 30 that extend therethrough. The apertures 30 are positioned generally adjacent to the second portion 20 of the elongated member 14, wherein securing members 32 maybe extended through the aperture 30 and into a horizontal support beam 34 (preferably on the Lithibar machine) such that the first portion 18 is vertically orientated.

A plurality of brackets 36 is attached to the inner surface 22 of the second portion 20. Each of the brackets 36 has a W-shaped configuration such that each has a first outer leg 38, a second outer leg 40, a first inner leg 42 and a second inner leg 44. Each of the inner legs has a length equal to 2.5 inches. The outer legs each have a length equal to 3 inches. The outer legs of each of the rackets 36 have a lower end 46 that is spaced 5 inches apart from each other. Each of the outer legs has an upper end 48 that is spaced generally between 1 inch and ½ inch from the upper end 48 of an adjacently positioned outer leg of another of the brackets 36. The lower ends 46 of outer legs of adjacently positioned brackets 36 are spaced three inches apart. Each of the first 42 and second 44 inner legs has a junction spaced 1 inch from the second portion 20, and angles formed at a juncture of the outer and inner legs has a measurement generally between 80 degrees and 100 degrees.

A plate 50 has a first side 52 and a second side 54. A plurality of guide rods 56 is attached to the first side 52 of the plate 50. Each of the guide rods 56 is extended through one of the holes 26 such that the plate 50 is selectively positionable adjacent to or away from the inner surface 22. Ideally, guides 27 are attached to the outer surface of the second portion 20 and are positioned such that the holes 26 extend through the guides 27 and offer additional support for the rods 56.

In use, a first layer of the blocks 6 may be stacked on the brackets 36 in a first direction and a second layer of the blocks 7 stacked in a second direction. Additional layers may be added in a similar manner. The shape of the brackets 36 support the blocks in a manner so that they can be stacked in a cubed formation. The plate 50 is used for stabilizing the blocks 6.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A block holding device for holding a plurality of concrete blocks in a uniform manner as the blocks are made on a block maker, the blocks generally having a six-sided configuration with a leading edge pointing outward, a rear edge pointing inward and a pair of ends being angled inward from said leading edge to said rear edge, said device comprising:

a support comprising a planar elongated member having a bend therein such that a first portion and a second portion are defined, said bend being substantially equal to ninety degrees, said elongated member having an inner surface and an outer surface with respect to said bend;

a plurality of brackets being attached to said inner surface of said second portion, each of said brackets having a W-shaped configuration; and wherein a first layer of the blocks may be stacked on said brackets in a first direction and a second layer of the blocks stacked in a second direction such that the blocks are supported in an overall squared up orientation.

2. The block holding device as in claim 1, wherein said first portion having a plurality of holes extending therethrough, a plate having a first side and a second side, a plurality of guide rods being attached to said first side of said plate, each of said guide rods being extended through one of said holes such that said plate is selectively positionable adjacent to or away from said inner surface.

3. The block holding device as in claim 1, wherein said support further includes a flange being attached to and extending along an edge of said elongated member, said flange lying in a plane orientated generally perpendicular to a plane of said elongated member, said flange being positioned adjacent to said outer surface.

4. The block holding device as in claim 3, wherein said flange has a plurality of apertures extending therethrough, said apertures being positioned generally adjacent to said second portion of said elongated member, wherein securing members may be extended through said aperture and into a horizontal support beam such that said first portion is vertically orientated.

5. The block holding device as in claim 1, wherein each of said brackets has a first outer leg, a second outer leg, a first inner leg and a second inner leg, each of said inner legs having a length equal to 2.5 inches, each of said outer legs having a length equal to 3 inches.

6. The block holding device as in claim 5, wherein said outer legs of each of said brackets has a lower end, said lower ends of said legs being spaced 5 inches apart from each other, each of said outer legs having an upper end being spaced generally between 1 inch and ½ inch from said upper end of an adjacently positioned outer leg of another of said brackets.

7. The block holding device as in claim 6, wherein said lower ends of said outer legs of adjacently positioned brackets are spaced three inches apart.

8. The block holding device as in claim 5, each of said first and second inner legs has a junction spaced 1 inch from said second portion.

9. The block holding device as in claim 8, wherein angles formed at a juncture of said outer and inner legs have a measurement generally between 80 degrees and 100 degrees.

10. A block holding device for holding a plurality of concrete blocks in a uniform manner as the blocks are made on a block maker, the blocks generally having a six-sided configuration with a leading edge pointing outward, a rear edge pointing inward and a pair of ends being angled inward from said leading edge to said rear edge, said device comprising:

a support comprising a planar elongated member having a bend therein such that a first portion and a second portion are defined, said bend being substantially equal to ninety degrees, said elongated member having an inner surface and an outer surface with respect to said bend, said first portion having a plurality of holes extending therethrough, a flange being attached to and extending along an edge of said elongated member, said flange lying in a plane orientated generally perpendicular to a plane of said elongated member, said flange being positioned adjacent to said outer surface, said flange having a plurality of apertures extending therethrough, said apertures being positioned generally adjacent to said second portion of said elongated member, wherein securing members maybe extended through said aperture and into a horizontal support beam such that said first portion is vertically orientated;

a plurality of brackets being attached to said inner surface of said second portion, each of said brackets having a W-shaped configuration such that each has a first outer leg, a second outer leg, a first inner leg and a second inner leg, each of said inner legs having a length equal to 2.5 inches, each of said outer legs having a length equal to 3 inches, said outer legs of each of said brackets having a lower end being spaced 5 inches apart from each other, each of said outer legs having an upper end being spaced generally between 1 inch and ½ inch from said upper end of an adjacently positioned outer leg of another of said brackets, said lower ends of outer legs of adjacently positioned brackets being spaced three inches apart, each of said first and second inner legs having a junction spaced 1 inch from said second portion, angles formed at a juncture of said outer and inner legs having a measurement generally between 80 degrees and 100 degrees;

a plate having a first side and a second side, a plurality of guide rods being attached to said first of said plate, each of said guide rods being extended through one of said holes such that said plate is selectively positionable adjacent to or away from said inner surface; and wherein a first layer of the blocks may be stacked on said brackets in a first direction and a second layer of the blocks stacked in a second direction such that the blocks are supported in an overall squared up orientation.

* * * * *